Figure 1:
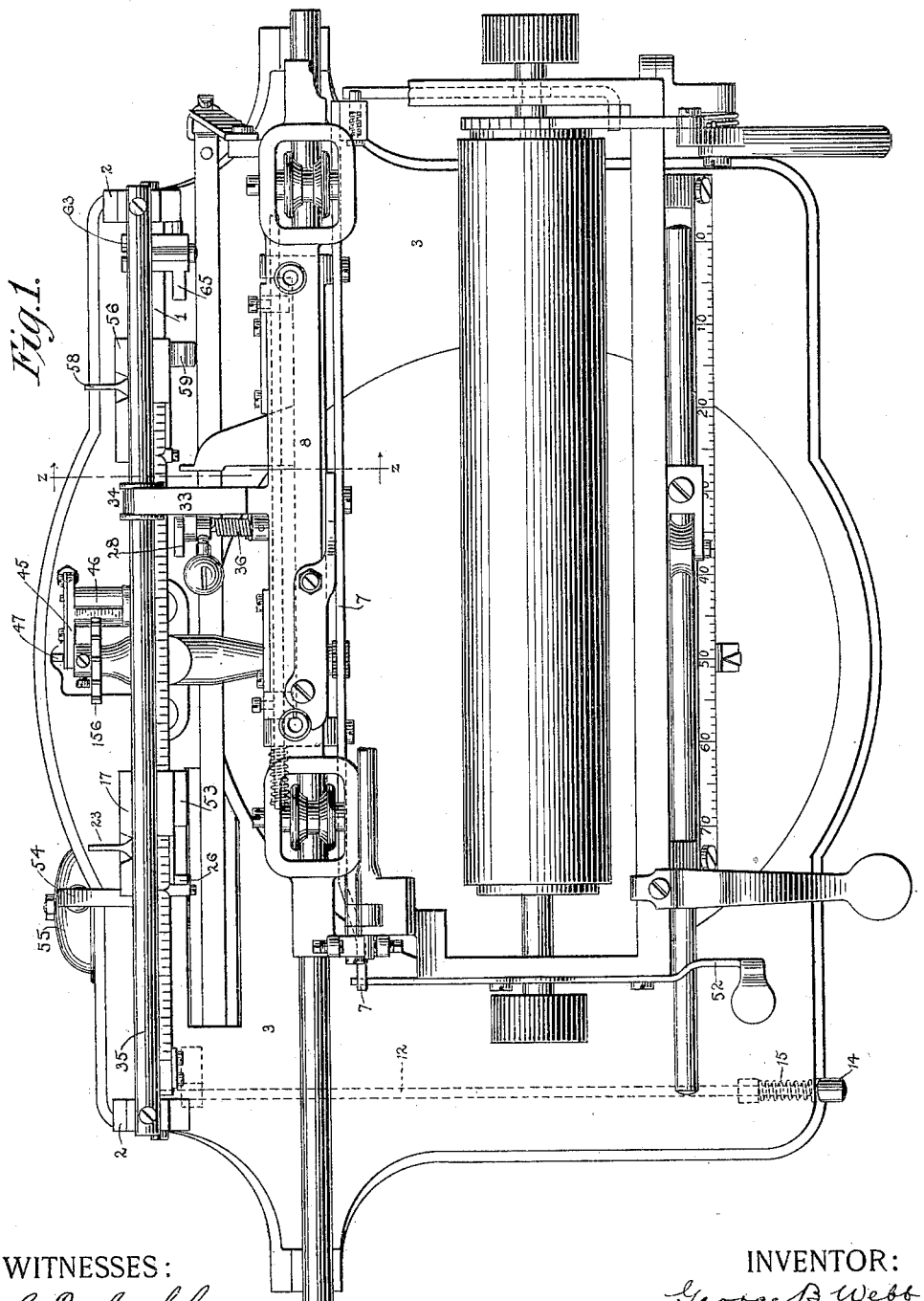

(No Model.) 9 Sheets—Sheet 1.

G. B. WEBB.
TYPE WRITING MACHINE.

No. 599,428. Patented Feb. 22, 1898.

WITNESSES:
C. E. Ashley
H. W. Lloyd

INVENTOR:
George B. Webb
By his Attorney
Jacob Felbel

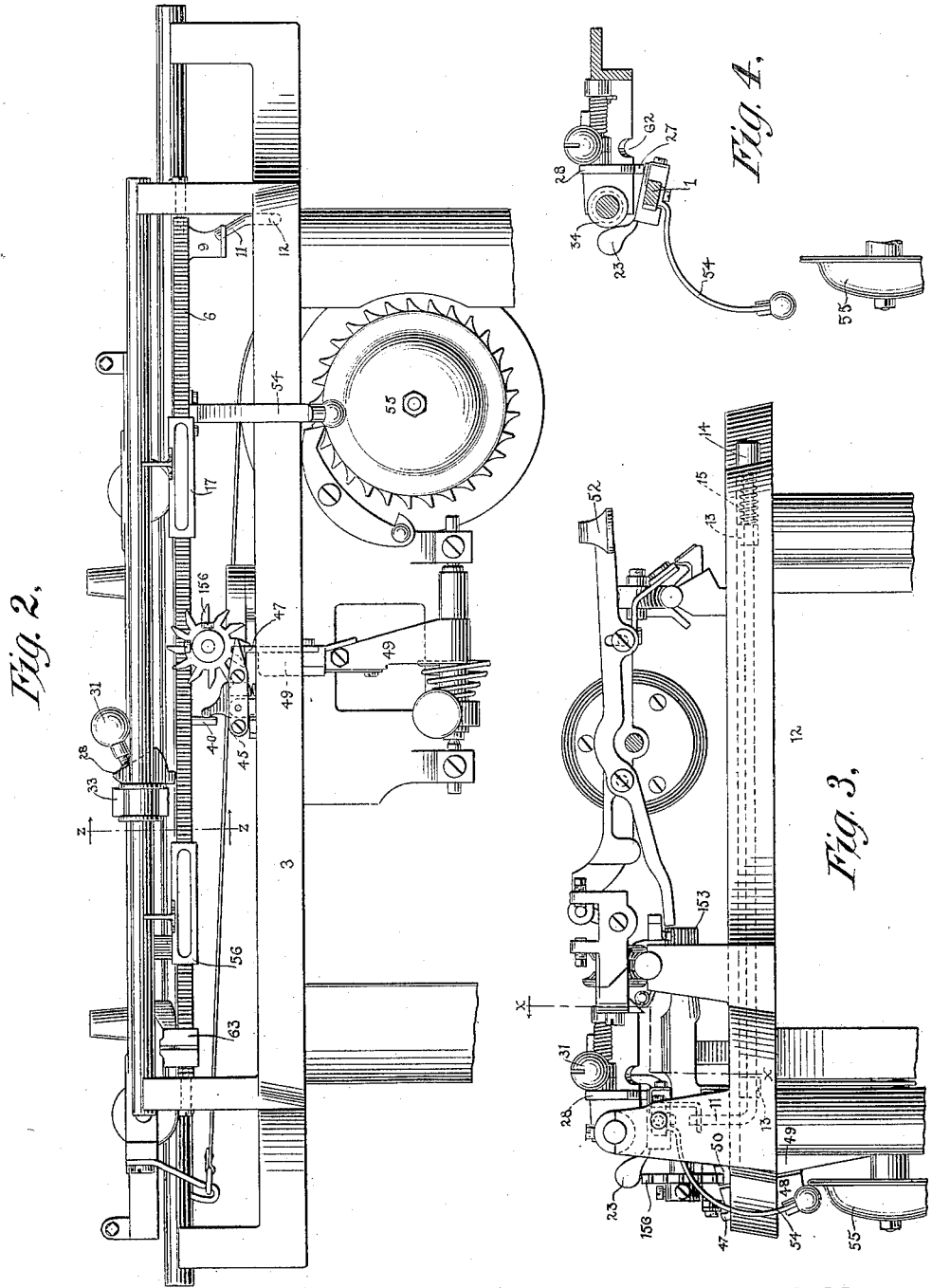

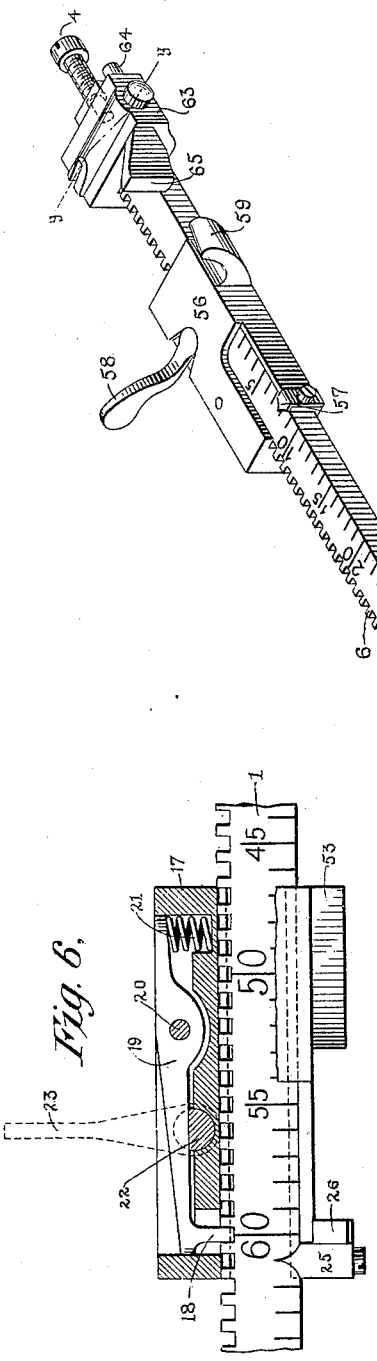

(No Model.)  9 Sheets—Sheet 4.

G. B. WEBB.
TYPE WRITING MACHINE.

No. 599,428.  Patented Feb. 22, 1898.

WITNESSES:
C. E. Ashley
H. W. Lloyd.

INVENTOR:
George B. Webb
By his Attorney
Jacob Felbel

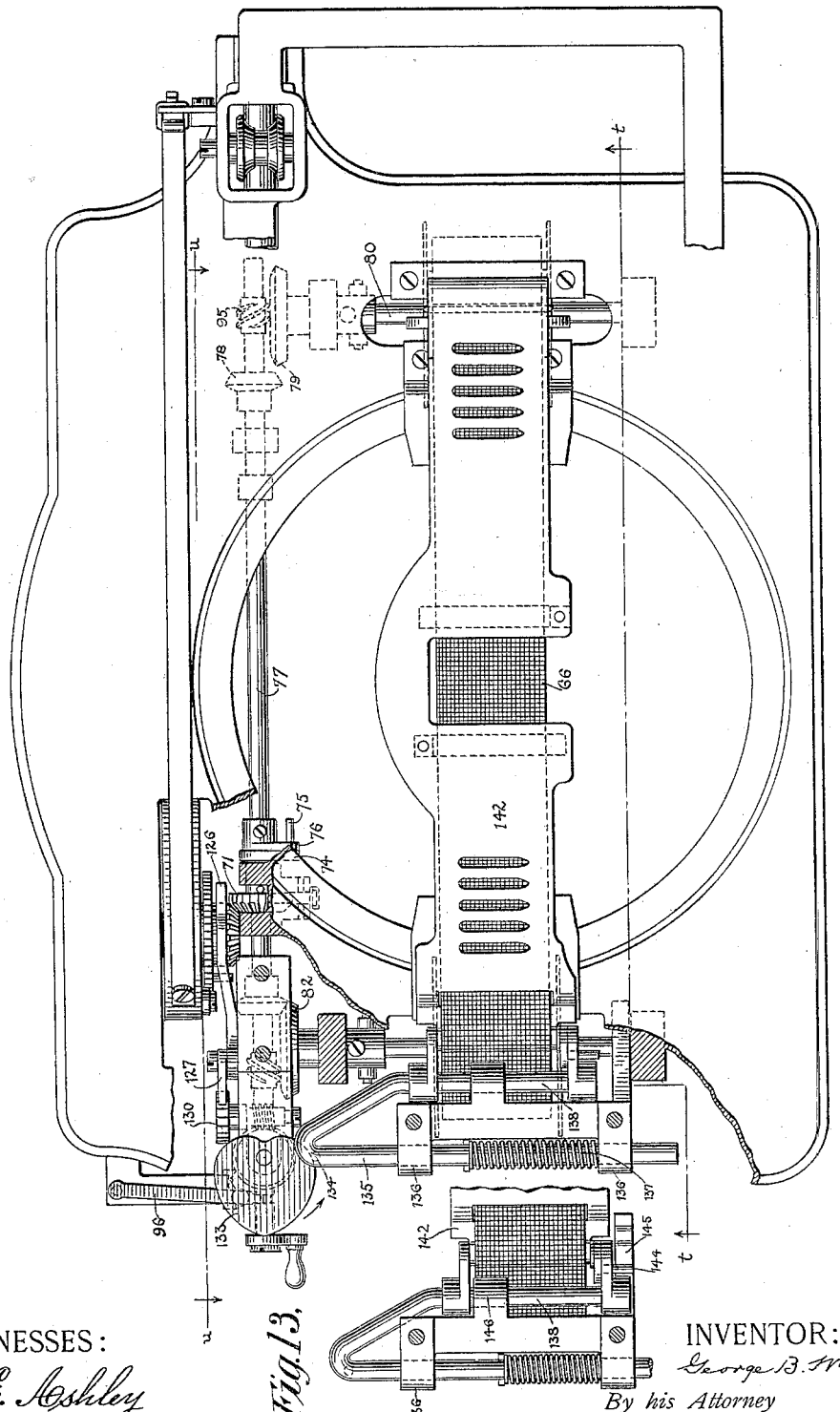

(No Model.) 9 Sheets—Sheet 6.
G. B. WEBB.
TYPE WRITING MACHINE.
No. 599,428. Patented Feb. 22, 1898.
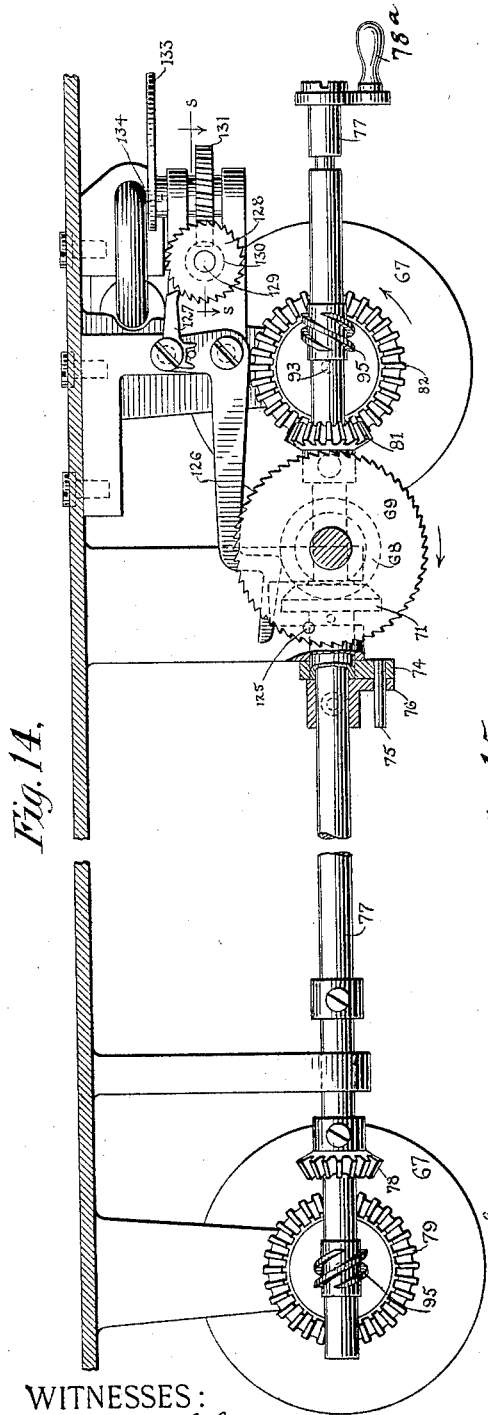
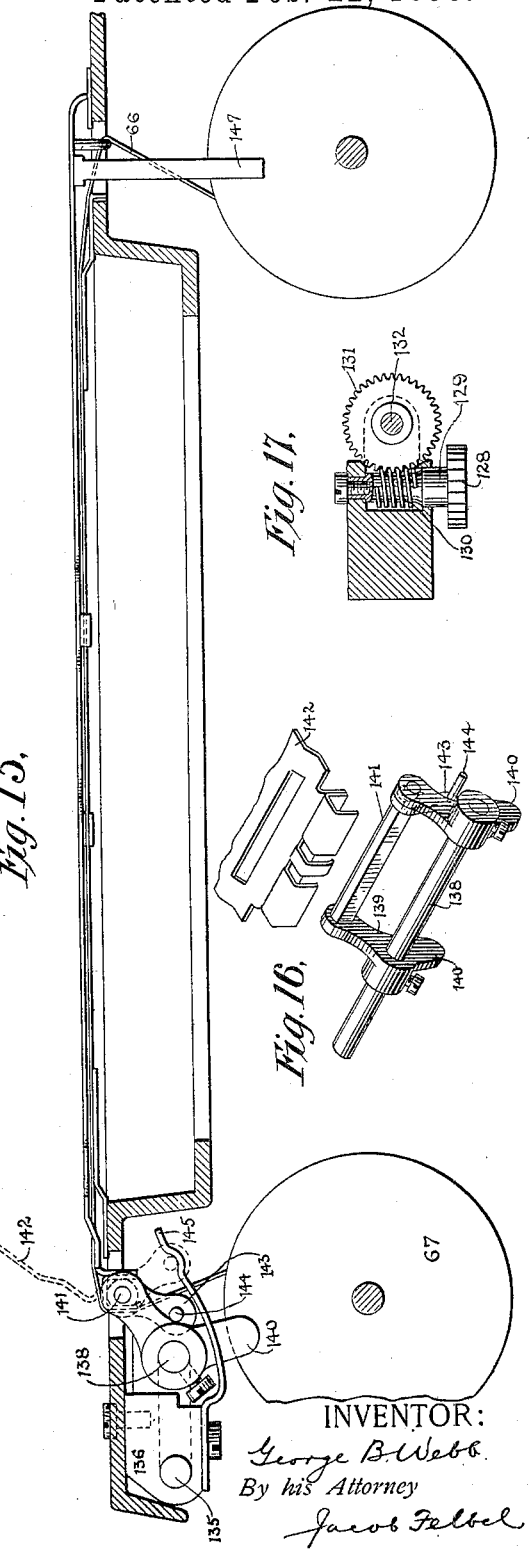
WITNESSES:
C. E. Ashley
I. H. W. Lloyd.
INVENTOR:
George B. Webb.
By his Attorney
Jacob Felbel (No Model.) 9 Sheets—Sheet 7.
G. B. WEBB.
TYPE WRITING MACHINE.
No. 599,428. Patented Feb. 22, 1898.
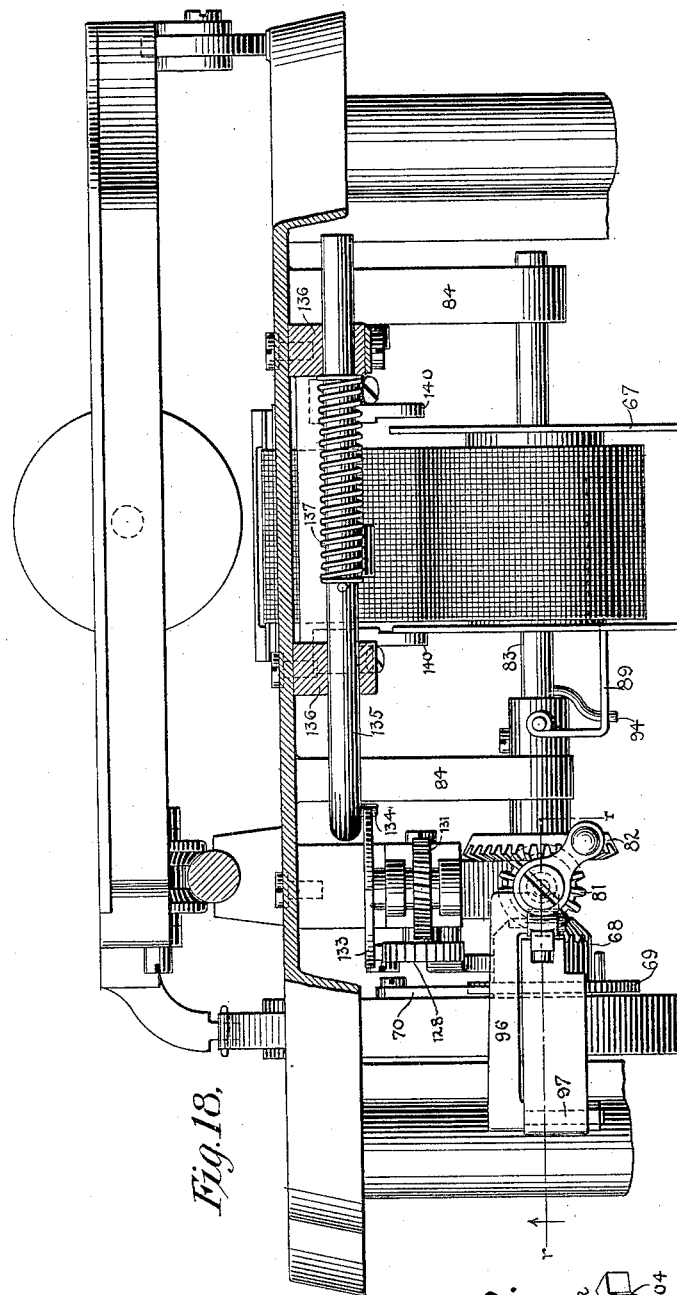
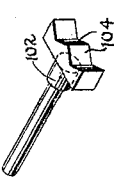
WITNESSES:
C. E. Ashley
I. W. Lloyd
INVENTOR:
George B. Webb
By his Attorney
Jacob Felbel (No Model.) 9 Sheets—Sheet 8.
G. B. WEBB.
TYPE WRITING MACHINE.
No. 599,428. Patented Feb. 22, 1898.
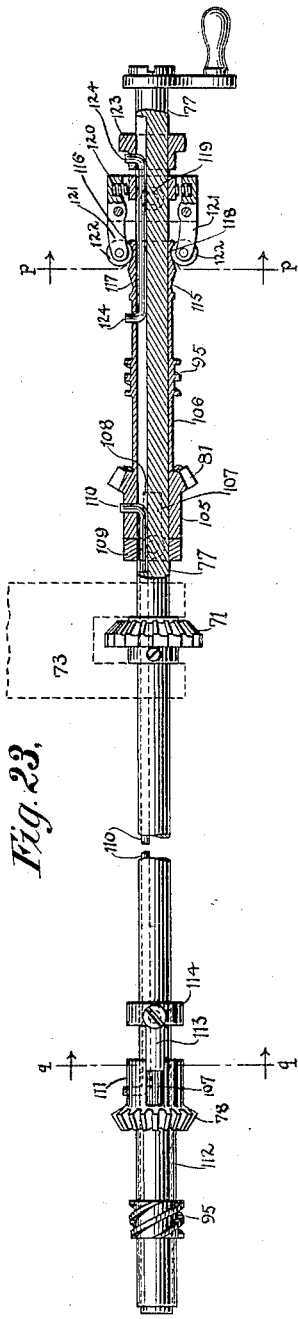
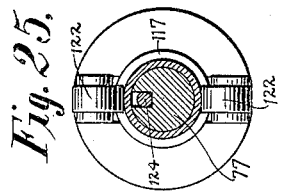
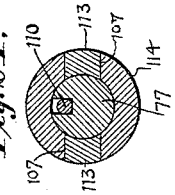
WITNESSES:
C. E. Ashley
I. W. Lloyd.
INVENTOR:
George B Webb
By his Attorney
Jacob Felbel (No Model.) 9 Sheets—Sheet 9.

G. B. WEBB.
TYPE WRITING MACHINE.

No. 599,428. Patented Feb. 22, 1898.

WITNESSES:
C. E. Ashley
M. W. Pool

INVENTOR:
George B. Webb.
By his Attorney
Jacob Felbel.

UNITED STATES PATENT OFFICE.

GEORGE B. WEBB, OF WESTFIELD, NEW JERSEY, ASSIGNOR TO THE WYCKOFF, SEAMANS & BENEDICT, OF ILION, NEW YORK.

TYPE-WRITING MACHINE.

SPECIFICATION forming part of Letters Patent No. 599,428, dated February 22, 1898.

Application filed February 8, 1897. Serial No. 622,407. (No model.) Patented in England September 26, 1896, No. 6,912.

*To all whom it may concern:*

Be it known that I, GEORGE B. WEBB, a citizen of the United States, and a resident of Westfield, in the county of Union and State of New Jersey, have invented certain new and useful Improvements in Type-Writing Machines, of which the following is a specification.

Nearly all of the following improvements have received protection in Great Britain by Patent No. 6,912, dated September 26, 1896.

The present improvements relate more particularly to means for arresting the paper-carriage and for locking the escapement and printing mechanisms at the end of a predetermined line, to means for releasing the paper-carriage and the escapement and printing mechanisms to enable printing to be done beyond the predetermined line after the carriage has once been stopped and the escapement and printing mechanisms have once been locked, to a final or extreme carriage-stopping and line-locking means, to bell or alarm mechanism, to means for arresting the return movement of the paper-carriage at a predetermined margin, to means for enabling the carriage to pass beyond the predetermined margin in a right-hand direction to print within the margin and to enable the carriage in its forward movement to automatically pass by the marginal stop, to an improved construction of margin-stop and line-stop and supporting rod or bar therefor, to means for automatically moving the inking-ribbon crosswise or in the direction of its width, to means for automatically reversing the longitudinal travel of the ribbon when the paying-out spool, reel, or support becomes exhausted, to means for stopping the back rotation of the escapement-wheel when the carriage is returned, and to other improvements which will be set forth in the following description.

The main objects of my invention are to improve the construction and mode of operation of what is known as the "Remington No. 6" machine; but it will of course be understood that the improvements may be embodied in other forms or types of machines.

My invention consists in the various features of construction and combinations of devices hereinafter more fully described, and particularly pointed out in the appended claims.

Figure 9:
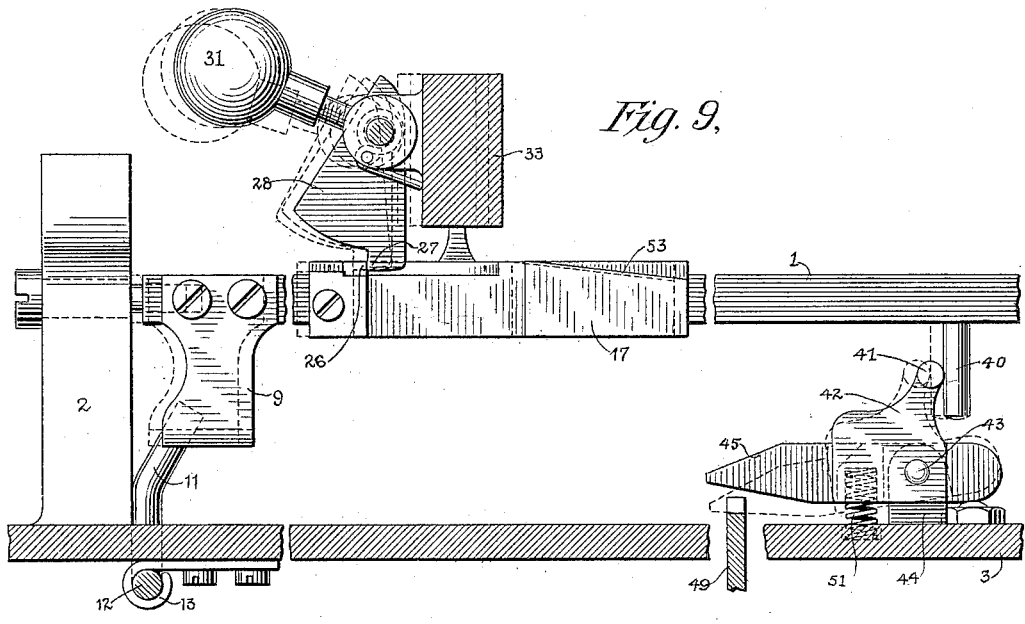
Figure 10:
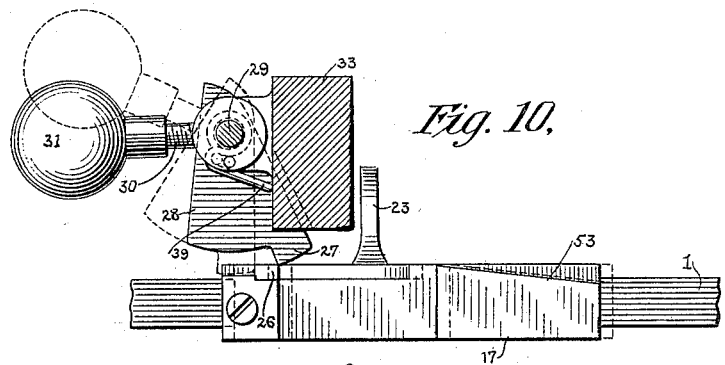
Figure 11:
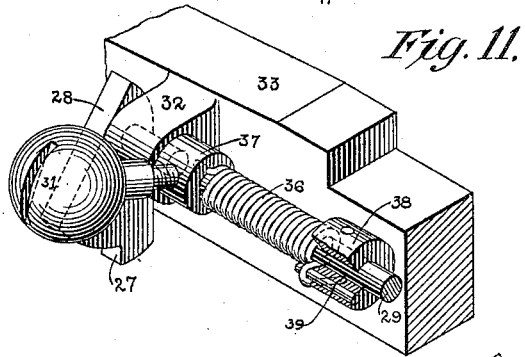
Figure 26:
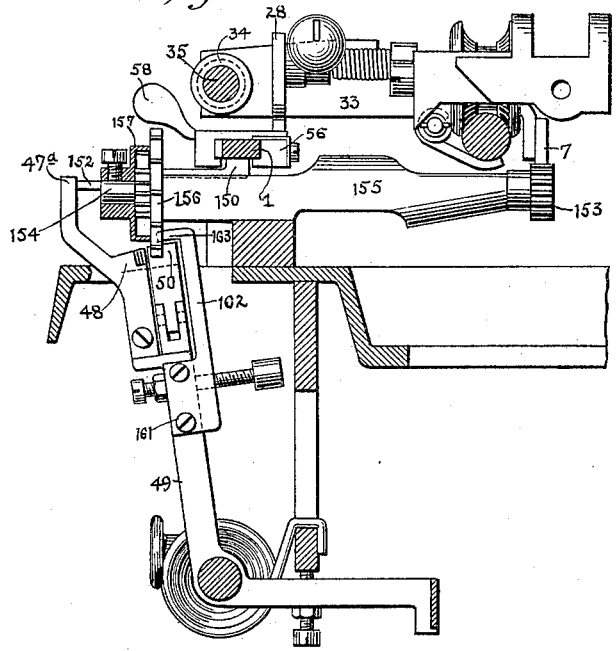
Figure 27:
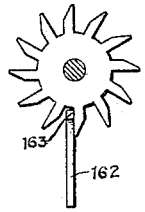
Figure 28:
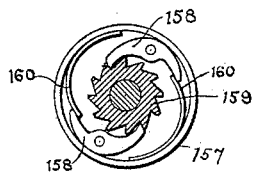
Figure 29:
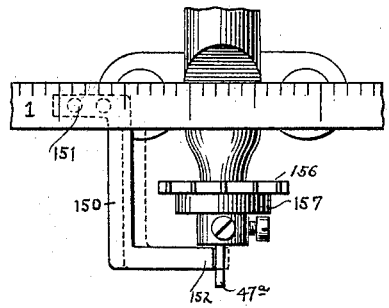

In the accompanying drawings, Figure 1 is a top plan view of the machine, showing particularly the means for arresting the paper-carriage and locking the printing and escapement mechanisms at the end of a predetermined line; also, the means for releasing the paper-carriage and the escapement and printing mechanisms to enable printing to be done beyond the arresting and locking point; also, the bell or alarm mechanism; also, means for arresting the return movement of the paper-carriage at a predetermined margin, and also the means for enabling the paper-carriage to pass beyond the said arresting-point, so that printing may be done within the margin, &c. Fig. 2 is a rear view of the machine as shown at Fig. 1, the type-bars, the key-levers, &c., being omitted to avoid complication and to enable the parts to be exhibited on a larger scale. Fig. 3 is a left-hand end view of the upper portion of the machine. Fig. 4 is a detail sectional end view to illustrate more particularly the bell mechanism. Fig. 5 is an enlarged perspective view of the rocking bar or rod with its marginal stops, bell-hammer, &c., and showing also a part of the escapement-locking mechanism. Fig. 5ª is a detail perspective view showing the final left-hand carriage and line-stop. Fig. 6 is an enlarged sectional plan view of the left-hand adjustable collar, stop, or slide. Fig. 7 is a vertical section on the line $z\ z$ of Figs. 1 and 2, but with the sliding push-rod which is connected to the rocking bar added in dotted lines. Fig. 8 is a vertical section on the line $y\ y$ of Fig. 5. Fig. 9 is an enlarged front sectional elevation in the plane $x\ x$ of Fig. 3. Fig. 10 is an enlarged detail view of the rocking bar, its slide or collar, and the swinging plate or actuator. Fig. 11 is an enlarged perspective view showing the mode of constructing and mounting the actuating-plate. Fig. 12 is a top plan view showing more particularly the ribbon moving and reversing mechanisms. Fig. 13 is a detail plan view of the slide for moving the left-hand ribbon-spool employed in the construction shown at Fig. 12. Fig. 14 is a vertical cross-section taken at the line *u u* of Fig. 12. Fig. 15 is a like section taken at the line *t t* of Fig. 12. Fig. 16 is a perspective view showing the left-hand ribbon-spool fork or moving device and showing also the left-hand end of the ribbon-plate, which is separably attached to a bar forming a part of said fork. Fig. 17 is a vertical cross-section taken at the line *s s* of Fig. 14. Fig. 18 is a left-hand elevation, partly in section, of the machine illustrated at Fig. 12. Fig. 19 is a horizontal section taken at the line *r r* of Fig. 18. Fig. 20 is a vertical section of part of the ribbon moving and reversing mechanisms. Fig. 21 is a perspective view of the ribbon-reversing lever and its pin. Fig. 22 is a detail perspective view of the T-shaped holding or latching pin or device. (Shown also at Fig. 19.) Fig. 23 is a sectional rear elevation of a modification of the means for reversing the spool-driving gears. Fig. 24 is a cross-section on the line *q q* of Fig. 23. Fig. 25 is a cross-section on the line *p p* of Fig. 23. Fig. 26 is a vertical cross-section taken through the escapement and line-locking mechanisms. Fig. 27 is a rear elevation of the escapement-wheel and its stopping-arm. (Shown also in Fig. 26.) Fig. 28 is a vertical section of the escapement-wheel and shaft-ratchet mechanism. Fig. 29 is a plan view of the escapement-locking device carried out in another form from that shown in the remaining views, excepting Fig. 26.

In the various views the same part will be found designated by the same numeral of reference.

At the rear side of the machine is a bar or rod 1, preferably rectangular in cross-section and pivotally supported at its ends in uprights or standards 2 on the top plate 3, one at the right and the other at the left hand side thereof. The pivots of the bars are made in the form of screws 4, having plain or unthreaded ends 5 which enter plain holes in the ends of the bar or rod 1, the threaded portion screwing into threaded holes in the standards. This bar is formed at its rear side with a series of teeth 6, forming a series of intermediate notches, which may be equal in number to the teeth and notches of the carriage feed-rack 7 and the number of letter-spaces to which the carriage 8 is susceptible. The said bar is preferably graduated on its upper face or marked with numerals and lines to correspond with the number of notches or teeth thereon to facilitate the adjustment of the various devices movably mounted thereupon. The said bar is arranged parallel with the path of travel of the carriage and has a slight endwise movement upon its pivots or centers for the purpose of locking the escapement mechanism and through it the printing mechanism at a predetermined time, as will be presently referred to. Projecting downwardly from said rocking and endwise-moving bar is an arm 9, which has a rearwardly-extended portion 10, which is slotted and which engages with an upright projection 11, that slides in a slot in the top plate, the said projection being at the rear end of a push-rod 12, which is suitably supported by bearings 13 under the top plate at the left-hand side and projects slightly beyond the front edge of said top plate, where it is provided with a head or button 14. Surrounding said push-rod is a coiled spring 15 for returning it and the rocking bar 1, which is connected thereto, as above explained.

The device which is provided to arrest the forward movement of the carriage and at the same time by the power of the carriage-driving spring in the drum or holder 16 to communicate endwise movement to the rocking bar 1 to lock the escapement mechanism performs also a function in the alarm or bell mechanism which will hereinafter be referred to.

I shall describe at this time more particularly the carriage-arresting and line-locking functions of the device, which generally is an oblong box-like structure 17, surrounding or embracing the rocking bar and provided with a spring tooth or dog 18, adapted to engage any of the notches on said bar. The said dog is formed at one end of a lever 19, pivoted at 20 within the box and provided at its opposite end with a coiled spring 21, adapted to maintain the dog in engagement with a notch on the rocking bar. A cam, eccentric, or the like 22, having a handle portion 23, is pivoted on or in said device 17 to enable the dog or detent to be withdrawn from the notch by either a right or left hand movement of the hand piece or lever in order that the locking device, box, collar, or slide 17 may be adjusted or moved to any desired point on said bar. The cam or the like may, as shown at Fig. 6, consist of a vertical pivot having one flat side to coact with the lever 19. From this construction it will be seen that when the handle 23 is turned in either direction the lever 19 is forced outwardly and the dog is withdrawn from the notch. When the handle is released, the spring 21 forces the dog into reëngagement with the rocking bar. By reason of the stops or shoulders 24, formed by the notch or cut in the top of the block or slide, the lever has a limited motion in each direction, and hence cannot be moved to such an extent that the dog may be permanently locked out of engaging action. On the inner side, preferably, of said sliding box or device is mounted an index or pointer 25, which coöperates with the scale or graduations on the upper side of said bar to facilitate the adjustment of the device. At the locality of said pointer and on the right-hand side thereof, preferably, is a lug or abutment 26, which is adapted to receive a projection 27 at the lower free end of a pendent arm or plate 28, secured on the rear end of a long pivot or rock shaft 29, arranged on the carriage at right angles to the rocking bar and provided with an arm 30, to which is attached an adjustable weight 31, which tends to maintain the said pendent plate or arm in a substantially vertical position. The said rock-shaft 29 is supported at its outer or rearmost end in a lug 32 on the left-hand side of the rearwardly-projecting carriage-arm 33, which is forked at its extremity to embrace a collar 34, that slides on a guide-rod 35, and the inner or forward end of said rock-shaft takes a bearing in the carriage 8. Surrounding said pivot or rock shaft is a small coiled spring 36, attached at one end to a collar 37 on said shaft and at its other end to another collar 38, also on said shaft, and the spring at its latter end is prolonged or made straight, as at 39, so that in the normal position of the pendent arm or plate 28 the extremity of the straight part of the spring bears against the side of the carriage-arm 33. This spring acts against the weighted arm to move the pendent projection slightly forward when the carriage-arresting and line-locking mechanism is released.

On the under side of the rocking bar 1, at a point slightly on the right of the escapement mechanism, is a downwardly-projecting pin 40, which rests in contact with a forwardly-extending pin or projection 41 on a rocker-arm 42, which has a pivot 43, mounted or fixed in a suitable bearing 44 on the top plate 3. There is also mounted on said fixed pivot 43, at its rearmost end, an arm 45, which projects toward the left (viewed from the front of the machine) and which, by an integral member or bar 46, is connected to the aforesaid rocker-bar 42. The said arm 45 is adapted to enter a notch in the dog holder or rocker and thereby prevent the latter from oscillating and the printing mechanism or type-bars connected thereto (through the universal bar and the key-levers, as customary) from being printed or being lifted to an extent sufficient to enable the impression of the type to be made on the paper in case the key-levers should be struck after the arm has entered the notch in the dog holder or rocker. This notch is formed by providing a flange or projection 47 at the rear edge of the rigid escapement-dog 48, which is attached to and forms a part of the usual rocker-arm 49 and which rocker also carries the pivoted or yielding escapement-dog 50.

The locking of the escapement mechanism is effected in the following manner: When the projection 27 on the pendent arm or plate 28 strikes the lug 26 on the box or collar on the locking-bar, the said bar is caused to move endwise toward the left for a short distance, as above explained, and in moving in this direction the pin 40 on the under side of said bar, bearing against the pin 41 on the rocker-arm 42 on the framework, operates to rock said arm 42 and cause the rear horizontally-arranged leftward-projecting arm 45 to descend far enough to enable its free end to engage with the notch in the dog-rocker, or, in other words, come down in front of the flange or projection 47 thereof, and thus prevent the dog holder or rocker from vibrating forwardly. (See Fig. 9.) A small coiled spring 51 is employed to restore the rocker-arm 42 and the arm 45, which locks the dog-rocker, (or the frame comprising these two devices,) when the line-locking projections or lugs 26 and 27 are separated and the rocking bar 1 is permitted to slide back to its normal position, which it does under the influence of the same spring 51 which restores the rocker-arm 42 and the locking-arm 45 to their normal positions.

From what has been said above it will of course be understood that when the carriage has been arrested and the dog-rocker locked the carriage may either be returned for the beginning of a new line or the rocking bar may be tilted to enable the pendent projection 27 to step over the lug 26 on the rocker-bar to permit several more characters to be printed on the line. The locking of the dog-rocker may be effected at or during the first half of the letter-space movement, the remaining half of the letter-space movement being permitted by reason of the capacity of the pendent projection 27 to yield under the superior power of the carriage-driving spring. On releasing the dog-rocker 49 by tilting the rocking-bar 1 the latter is moved back toward the right by the spring 51 and the pendent projection is vibrated slightly toward the left by its coiled spring 36, thereby insuring the pendent projection riding over the top of the lug or abutment 26 on the collar mounted on the rocking-bar (see Fig. 10) and hence preventing any reëngagement or relocking of these devices which would interfere with the further progress of the carriage.

The pendent projection 27 is made to yield toward the right (viewed from the front of the machine) for the purpose of enabling the carriage to be run swiftly from one end of its travel to the other or swiftly over a number of spaces from right to left, if desired, when the release-key 52 is pressed upon and the parts of the escapement mechanism of the carriage are separated or disengaged. If the said pendent projection 27 were not adapted to yield in this way, when it should strike the lug 26 on the rocking bar it would arrest the carriage suddenly or violently and would break or strain some of the parts. In other words, if this pendent projection were made rigid instead of yielding during a swift movement of the carriage or a sudden stoppage thereof the dog-rocker or locking devices, which are small and delicate, would be severely strained or injured, if not broken, at the time of the sudden stoppage of the carriage if at that moment the dog-rocker were in a forward position and the locking-arm were brought down on top of the dog-rocker instead of into the notch thereof. By making the pendent projection yielding when it strikes the lug on the rocker-bar during a swift continuous movement of the carriage under the unrestrained influence of the carriage-driving spring it is tilted by the lug against the tension of its coiled spring and creeps up and rides over the top of said lug and passes by the same, after which the spring returns it to normal position. When the pendent projection has passed by the lug on the rocker-bar in any case and when the carriage is returned, the right-hand side of the pendent projection strikes against the left-hand side of the lug on the rocker-bar and the pendent projection is tilted in a reverse direction to enable it to pass by said lug, whereupon the weight attached to said projection restores it to its normal position.

I shall now describe the action of the pendent projection with reference to the bell mechanism.

On the slide or collar which bears the locking-lug 26 and in advance of the same or on the right-hand side thereof, but in the same vertical plane, is formed or provided an extension or ledge 53, which is inclined or beveled downwardly slightly from its left-hand edge, as shown clearly at Figs. 5, 9, and 10. When the pendent projection 27 arrives at this inclined ledge, it operates to gradually depress the same and thereby tilt the rocking bar and raise the bell-hammer arm 54, which is fastened to the under side of said bar. By the time the carriage has made about seven letter-space movements while the pendent projection is in contact with the ledge the projection has tilted the rocking bar to the required extent, and it then passes out of contact with the ledge, thereby releasing the rocking bar and enabling it to return to its normal position under the action of its restoring-spring, during which movement the free end of the bell-hammer arm strikes the bell 55, which is preferably located on the axis of the spring driving-drum and may constitute a handle or knob whereby the carriage-driving spring may be tightened or increased in tension. After the tilting of the rocking bar and the ringing of the bell the pendent projection 27 may pass on to the locking lug or abutment 26 aforesaid, and preferably said lug is located a distance equal to about six letter-spaces from the left-hand end of the inclined ledge. During the return movement of the carriage for the beginning of a new line the pendent projection first strikes the vertical end of the inclined ledge and is tilted thereby to enable the proper recession of the carriage. On passing off the ledge on the return movement of the carriage the pendent projection is restored to its normal vertical position by the weight aforesaid.

I shall now describe the marginal devices on the right-hand side.

The adjustable marginal stop collar or device 56 at the right-hand side of the machine is substantially the same in construction as the line-locking contact device 17 at the left-hand side of the machine and before described. It is provided with a pointer or index 57 to facilitate the setting or adjustment of the collar or stop and with a spring-actuated detent and cam-releasing lever 58. It is also provided with an upright projection or horn 59, which is adapted to stop the return movement of the carriage. Any suitable part of the carriage may be arranged to contact with the said projection or horn; but it is preferable to have the arm 60, which extends rearwardly from the feed-rack or its support 61, pivoted on the carriage 8, come in contact with the said upright horn 59 to arrest the carriage in substantially the manner set forth in my United States Patent No. 567,799, dated September 15, 1896, which relates to the said Remington machine No. 6. The said horn being mounted upon the rocker-bar by means of the sliding collar and being arranged on the front side of said bar, it is adapted to be depressed by the tilting of said bar to a plane below that in which the arm 60 on the carriage travels, (shown by the dotted line at Fig. 7,) so that after the carriage has been arrested on its return movement at a predetermined or desired marginal point the carriage may be moved still farther in the same direction for printing within the margin, assuming, of course, that the marginal stop or horn 59 is not set at its extreme right-hand position. On the forward movement of the carriage during the process of writing said upright projection or horn 59 is automatically depressed again to enable the arm 60 to pass by it, which may be accomplished in several ways, but preferably by providing a notch or groove 62 in the carriage-arm 33 and also by beveling or inclining downwardly from left to right the upper free edge of the said upright projection or horn 59. The said carriage-arm 33 being in advance of the feed-rack arm 60, the notch or groove 62 comes into register with the beveled portion of the horn 59 and works along in contact therewith and gradually forces it down to a plane or position below that of the feed-rack arm 60, so that the latter may pass by said horn or projection as the carriage moves toward the left. The feed-rack arm 60 is preferably located nearly a quarter of an inch to the right of the carriage-arm 33; but the horn or projection is of a slightly greater width than the distance between these two parts, so that when it is released by the carriage-arm it at once strikes the feed-rack arm on its lower edge, and hence said projection or horn is prevented from rocking back to its first or normal position until the feed-rack arm 60 has likewise passed beyond or to the left of it.

In addition to the adjustable margin-stop having the horn just above described, there is provided also a final right-hand marginal or carriage stop 63, which is also adjustable upon the rocker-bar by means of a tooth at the end of a spring-pressed stem, as shown at Fig. 8. This stop is provided with a pin 64, which is adapted to abut against the right-hand top-plate standard 2, and it is also provided on its left-hand side with an arm or projection 65, against the vertical face of which the feed-rack arm 60 may contact to stop the carriage if the carriage be returned past the first marginal stop 56. This arm or projection 65 on the final stop 63 is arranged at such an elevation as that the curved root of the horn 59 on the first marginal stop may pass thereunder, so that the vertical edges or faces of both marginal stops may be brought in the same vertical plane at right angles to the direction of the rocker-bar in order, if desired, that the machine may be used as if there were only one marginal stop.

The ribbon-moving mechanism will now be described.

The inking-ribbon 66 is moved lengthwise or from one spool 67 to the other by substantially the same means and in substantially the same manner as in the usual Remington machine. In the present case, however, novel means are provided for moving the ribbon crosswise or widthwise, and novel means are also provided for automatically reversing the longitudinal travel of the ribbon. Upon the fixed pivot or stud of the spring-drum 16 is mounted a beveled gear 68 and a ratchet-wheel 69, which are united to turn together. A pawl 70, pivoted on the spring-drum, takes into the said ratchet-wheel and turns it and the beveled gear during the forward movement of the carriage, but slips idly over said gear during the return movement of the carriage. The said beveled gear meshes with another beveled or miter gear 71, fixed upon a sleeve 72, which has a bearing in a hanger or support 73, depending from the top plate 3, and which sleeve at its opposite end is provided with a crank-arm 74, that has a pin 75 projecting toward the right. This pin enters a hole in another crank-arm 76, which by means of a collar and set-screw is made fast on a long power-shaft 77, arranged at the rear of the machine and extending transversely thereof. This shaft passes through said sleeve and through the beveled gear thereon and takes a bearing in said sleeve and in other suitable supports and hangers, and by means of the crank-arms and connecting-pin, which is elongated, the rotation of the beveled gear 71 on the sleeve is transmitted to the said long power-shaft 77, while at the same time the said shaft is capable of longitudinal or endwise sliding movements without losing its connection with the driving beveled gear on the sleeve. At near the right-hand end of said long shaft is a beveled pinion 78, which is adapted to engage with and disengage from a larger beveled gear 79 on the right-hand ribbon-spool shaft 80, and at near the left-hand end of said long shaft 77 is a like beveled pinion 81, adapted to engage with and disengage from a like larger beveled gear 82 on the left-hand ribbon-spool shaft 83. By means of these two pairs of beveled gears either ribbon-spool shaft may be rotated by the power transmitted by the spring driving-drum, and hence the ribbon may be moved longitudinally by winding upon either spool in one direction or another, according to which pair of gears is in engagement. Each ribbon-spool shaft is adapted to turn in suitable bearings or supports 84, depending from the top plate, and on each shaft is mounted to rotate therewith a ribbon spool or reel 67.

The following is a description of the means whereby the ribbon is automatically reversed:

Each spool-body is formed with a longitudinal slot 85, and the rear head or flange of each spool is formed with an opening or cut-away 86 in line with said slot, as shown more particularly at Figs. 18 and 20. A collar 87 is secured by a set-screw to the spool-shaft at or near the rear bearing 84 thereof, and on this collar is pivoted at 88 a lever or arm 89, which is heavy or weighted at 90 and which extends through the opening 86 in the flange and into the longitudinal slot 85 in the body of the spool, which slot is parallel with the spool-axle and is of a depth sufficient to accommodate the said weighted arm. A hole or perforation 91 is formed centrally in the rear portion of the spool-shaft, which communicates with a slot or cut-away 92 in the spool-shaft. In this hole 91 works a pin 93, having one end 94 bent outwardly or laterally to engage with an aperture in the weighted arm or lever 89. That portion of the pin which is arranged within the hole at the center of the shaft extends rearwardly to about the end of the shaft when the weighted arm or lever is within the slot in the spool. Opposite each end of the spool-shaft and on the long power-shaft 77 is secured a collar which is formed or provided with a worm 95, adapted to coact with the pin 93 in the spool-shaft, as will be presently described. As before explained, the long power-shaft is adapted to play endwise a limited distance. This distance is governed by a spring-controlled arm 96 on the left-hand end of the shaft 77, which is preferably provided with a handle 78ᵃ. The spring-controlled arm works on a vertical pivot 97 on the framework and is extended forwardly and provided at its free end with a downwardly-extending portion or finger 98, which engages a circumferential groove 99 in the said shaft. In the rear of this finger 98 the said arm carries a small antifriction-roller 100, mounted to turn on a vertical pivot and adapted to be seated in either of two V-shaped notches 101, formed at the forward end of a T-shaped pin 102, adapted to slide in a bearing in the framework and provided with a spring 103, having a tendency to keep the T-shaped pin pressed forward and its head pressed against the antifriction-roller on the vibratory arm 96, which is connected with the power-shaft, whereby the power-shaft is adapted to be held in either of its two endwise positions and whereby it is adapted to be automatically moved endwise in either direction by means of the pins 93 and the worms 95, hereinbefore referred to.

The action or mode of operation of the reversing mechanism is as follows: When the ribbon has been entirely unwound from either spool and the slot 85 therein is turned to or comes on the under side of the spool-shaft, the weighted arm or lever 89 falls out of said slot and the motion of said lever is communicated to the sliding pin 93, which normally stands about flush with the end of the spool-shaft, and said pin is projected slightly beyond the same and into engagement with its associated worm 95 on the power-shaft, which is constantly rotated during the forward movements of the paper-carriage. By the said engagement of the pin and worm the shaft 77 is caused to move endwise the required distance to disengage one set of the spool-driving gears—as, for instance, 78 and 79—and engage the other set—as, for example, 81 and 82. In other words, the two gears which were operating together to wind the ribbon upon their associated spool are separated and the other two gears which were out of engagement at this time are automatically brought into mesh by the endwise sliding of said shaft 77, due to the coöperation of the pin and the worm, so as to thereafter cause their associated spool to become the winding-spool. Thus the longitudinal movement or travel of the ribbon is automatically reversed. This automatic reversal takes place every time either paying-out spool becomes exhausted and when the weighted arm or lever thereof may drop or descend and communicate its motion to the worm-engaging pin. It will of course be understood that immediately after the reversing action has taken place and the ribbon commences to wind upon the empty spool the weighted arm or lever, being attached to the ribbon-spool shaft, ascends as said shaft and its spool are rotated, and when the weight has been carried up past the horizontal center of said shaft it falls by gravity into the slot 85 in the spool, and before the said lever can travel around on the opposite side of said shaft to a position where it might again fall out of said slot the first coil or fold of the ribbon passes over said slot and thus holds the lever therein. Hence by the wrapping of the ribbon over the slot the lever is retained securely in the slot and out of operative position during the charging or rewinding of its spool.

When it is desired to change ribbons, new full spools constructed as above described may replace those on the machine, or the old spools may remain and the ends of the new ribbon attached thereto. When new spools are substituted, they are slipped onto their shafts, and the pin-actuating levers or arms 89 are passed through the head-slots 86 and into the longitudinal slots or depressions 85 in the bodies of the spools between the coils of the ribbon and the axes of the spools.

While the weighted arm or lever is preferred, or an arm or lever of such weight as will enable it to readily and quickly drop out of and into the slot in the spool as required, it will be understood that a non-weighted arm or lever provided with a spring for drawing the arm or lever out of the slot may be employed instead; but in this case the arm or lever will be returned to the slot, not by gravity or by the spring, but by the first coil or fold of the ribbon whose tension or strain would be sufficient to overcome the light spring required.

The arm 96, employed in connection with the longitudinally-shifting power-shaft 77, is so arranged and operated as that said shaft may be moved endwise by means of the pins and worms before described with very little friction and under an exceedingly slight force. Between the two notches 101, in which the antifriction-roller 100 is adapted to seat, are two oppositely-inclined or beveled surfaces 104, which the antifriction-roller is adapted to ride upon or against and easily wedge or force the spring-actuated T-shaped pin 102 backwardly to permit the arm 96 to vibrate, and when the center of the said antifriction-roller has passed over the top of the inclined surface 104 the coiled spring on the T-shaped pin forces the pin outwardly, and the other or opposite incline 104 forces or wedges the said roller down its surface and thus completes the shifting or endwise movement of the shaft 77 and holds the antifriction-roller at the bottom of the notch.

A modification will now be described of the means employed for automatically reversing the longitudinal travel of the ribbon.

Referring now particularly to Figs. 23, 24, and 25, the beveled gears which drive the ribbon-spool shafts alternately are shifted endwise without at the same time shifting the power-shaft 77 endwise, as in the previously-described mechanism, the power-shaft in this case having simply a rotatory movement. In Fig. 23 (which, it will be remembered, is a back view) the beveled pinion 81 is formed integral with a hub 105 on its inner side and with a sleeve 106 on its outer side, and the power-shaft passes through said beveled pinion and hub and sleeve. The sleeve carries the left-hand worm 95, (but shown on the right-hand side in the drawings because the view is taken from the rear of the machine,) and the hub is slotted longitudinally at 107 on diametrically opposite sides to receive two forks or projections 108, extending outwardly from a collar 109, which is fixed upon the power-shaft. The power-shaft is slotted or grooved longitudinally for nearly its entire length, and in said groove for a portion of its length runs a slender wire rod 110, which at its left-hand end is bent laterally or radially and connects with the hub 105, while at the right-hand end the said wire rod is likewise provided with a radial bend which engages with the hub 111 of the right-hand beveled pinion 78, which is likewise formed integral with said hub and with a sleeve 112, bearing a worm 95, the said hub 111 being also slotted on opposite sides, like the slots 107 of the hub 105, to coöperate with similar forks or projections 113, extending outwardly from the collar 114, secured by a set-screw to the power-shaft. The left-hand combined pinion, sleeve, and worm is formed or provided at its outer end with two circular notches or grooves 115 and 116 and two intermediate adjacent oppositely-inclined surfaces 117 and 118. Beyond said sleeve and nearer the left-hand end of the power-shaft and attached to the latter by a set-screw 119 is a collar 120, which is provided with two spring-actuated pivoted arms or levers 121, arranged diametrically opposite each other, and at the inner free ends of each of said levers is mounted a small antifriction-roller 122, adapted to the circular notches or grooves 115 and 116 referred to. Outside of the collar bearing the roller-arms is still another collar 123, which is loosely mounted upon the power-shaft, and said collar is connected by a wire 124 to the left-hand sleeve 106. All of the parts mounted upon the shaft 77 for longitudinal movement turn always with the shaft. Assuming that the pinion 78 is in engagement with its spool-shaft gear (as 82, Fig. 12) to turn its associated ribbon-spool and wind the ribbon thereupon, when the opposite spool has discharged all of its ribbon, the weighted arm or lever 89, Fig. 20, causes its sliding pin 91 to engage with the left-hand worm 95, and by such engagement the said worm is moved toward the left, thereby forcing its sleeve 106 and pinion 81 and double incline in the same direction, and, owing to the connection between the left-hand sleeve 106 and the right-hand sleeve 112 by the wire 110, the beveled gear 78 is simultaneously moved in the same direction and the engagement of the pinions is reversed. During this shifting movement of the parts the spring-pressed rollers 122, which remain relatively stationary, are forced apart by the outermost incline 118, and after the centers of the rollers have passed by the highest portion of the incline they cause the sleeves and their adjuncts or connections to move farther toward the left and sufficiently to complete the shifting movement and bring the left-hand pinion 81 positively and fully into engagement with the gear on its associated ribbon-spool shaft, so that the left-hand spool may thereafter become the winding-spool. When this spool is full, the reverse action automatically takes place again. The loose collar 123, which is connected to the sleeve 112 by the wire 124, is provided more especially to enable the shifting movements to be effected by hand instead of automatically, if desired, which hand-shift, it will be understood, may also be readily effected by moving the shaft itself endwise in the construction first-above described. In Fig. 23 the shaft 77 cannot be slid endwise because the beveled gear 71, which is driven by the beveled gear on the spring-drum, is formed on a sleeve which is fast on the shaft 77 and which fills the space between the forked hanger or bracket 73.

The means for moving the inking-ribbon crosswise or transversely will now be described.

On the ratchet-wheel 69, which is driven by the pawl 70 on the spring-drum, is secured a pin or lug 125, which acts to lift the free end of a lever 126, carrying a pivoted pawl 127, adapted to act on a ratchet-wheel 128, fixed on a horizontal shaft 129, which carries or is formed with a worm 130, that is in engagement with a worm-wheel 131 on a vertical shaft 132. At the upper end of the vertical worm-wheel shaft 132 is secured a heart-shaped cam 133, which acts against a pin 134 on the under side of a rod 135, adapted to slide in bearings 136, the said rod being provided with a coiled spring 137, which acts against said cam and operates to move the device rearwardly. Connected to or formed integral with the rod 135 is a bar 138, to which the ribbon-spool carrier, fork, frame, or moving device 139 is attached. The said ribbon-spool carrier 139 is formed or provided with arms 140 to embrace the heads of the spool and with a bearing or hinge-pin, as 141, for the left-hand end of the ribbon-guide plate 142. The said hinge pin or bar has a depending crank-arm 143 and a lateral arm 144, adapted to a flat spring 145, whereby the ribbon-guide plate is held in either of its two positions—that is, down in its horizontal working position or up in a non-working position—to facilitate cleaning of the types, &c. The bar 138 slides in an eye or bearing 146 at that portion which is parallel with the bar or rod 138. The ribbon-guide plate or arm 142, which extends across from one spool to the other, is removably attached to the pin 141 of the ribbon-spool carrier on the left and at its right-hand end is provided with two downwardly-extending fingers or arms 147, which embrace the heads or flanges of the right-hand spool, which slides freely on its shaft and in unison with the left-hand spool.

The operation of the mechanism for moving the ribbon crosswise is as follows: When the pin or lug 125 on the ratchet-wheel 69 raises the pawl-carrying lever 126, the pawl 127 is vibrated to turn the ratchet-wheel 128 and worm 130, worm-wheel 131, and cam 133, and the latter acting on the rods 135 and 138 the ribbon-carrier 139, the left-hand ribbon-spool, ribbon-guide plate, right-hand ribbon-spool, and ribbon are all moved forward or toward the operator, but very slightly. When the ribbon has been moved substantially its whole width in a forward direction, it then travels rearwardly under the action of the spring 137, following the recession of the cam. The cam movement is intermittent and the movements take place at comparatively long intervals apart, and these cam movements when effected are so extremely small that the ribbon movement effected thereby is likewise extremely slight. Hence the ribbon moves crosswise very slowly and in such minute spaces as that practically the entire surface of the ribbon is utilized.

The pawl-carrying lever 126 and its pawl 127 may be differently shaped and mounted, and the number of teeth on the ratchet-wheel 128 and worm-wheel 131 may be varied. The greater the number of teeth on these wheels the slower will be the feed of the ribbon.

Referring now to Fig. 5ª more particularly, 148 designates the final stop-collar on the left, which is constructed substantially like the final stop-collar 63 on the right, and is also mounted adjustably on the rocker-bar. This final left-hand stop 148 is provided with an inwardly-projecting arm 149, which stands in the path of the rearwardly-projecting carriage-arm 33 and arrests the carriage. When the carriage-arm strikes this collar-arm 149, the rocker-bar upon which it is mounted is forced leftward, and not only is the carriage arrested thereby, but the escapement and printing mechanisms are locked in the manner hereinbefore described with reference to the other locking collar or slide 17 on said rocker-bar.

From the foregoing description it will be observed that there are four adjustable stop collars or slides, one on the extreme left, (numbered 148,) one on the extreme right, (numbered 63,) and two intermediates, the one nearer the left being numbered 17 and the one nearer the right being numbered 56; but the carriage is adapted to pass by or step over only the two intermediate collars or slides. On the down or leftward movement of the carriage it is arrested first by the collar or slide 17, which may then be tilted, so that the carriage may pass beyond the same. On the return or rightward movement of the carriage it is arrested by the collar or slide 56, but it may be moved past or beyond said collar by tilting the same, as before described. If the carriage has been carried past said collar or slide 56, it will automatically pass by the same during the next travel toward the left, but the carriage will always be arrested in its down movement by the collar or slide 17. These collars 17 and 56 may be adjusted to any desired points upon the rocker-bar, so as to provide for various kinds of work. The left-hand final stop 148 determines absolutely the extent of travel of the carriage toward the left, and also acts as a means for locking the printing mechanism, while the right-hand final stop 63 determines absolutely the extent of right-hand travel of the carriage, but it does not operate as a means for locking the printing mechanism. These right-hand and left-hand final stops being adjustable, the total lengths of lines may be varied, and of course variations in the lines may be obtained in the use of the two intermediate stops.

Referring now more particularly to Figs. 26 to 29, inclusive, the rocker-bar 1, carrying the adjustable slides or collars, is here provided with an angular arm 150, which may be riveted to the under side of said rocker-bar, as indicated at 151. The free end 152 of the said arm is adapted to pass in front of a projection 47ª at the rear edge of the escapement-dog 148 when the said rocker-bar 1 is moved toward the left, as indicated by the dotted lines at Fig. 29, by reason of the contact of some moving part of or on the carriage with any of the collars which arrest the leftward movement of the carriage. When the free end of the arm 152 is thus projected in front of or in the path of vibration of the arm 47ª, the escapement mechanism and hence the printing mechanism are locked or prevented from performing their full functions, as hereinbefore referred to with reference to the locking devices shown in the other views. When the rocker-bar has been thus moved toward the left and the obstructing-arm brought into the path of vibration of the arm 47ª, (which may be said to be a part of the dog-rocker or the dog itself,) it remains in this condition until the carriage is either returned toward the right or is caused to step over the first arresting-stop, as in the construction first above described. As soon as the rocker-bar is freed from the action of the carriage-driving spring, which is the power by which said rocker-bar is moved toward the left, it returns immediately toward the right to its normal position by means of a spring which may be applied thereto at any convenient or suitable locality. When it may be desired to tilt the rocker-bar shown at Figs. 26 and 29 for stepping-over purposes, it is effected by means of the push-rod 12 shown in the other views.

For simplicity and cheapness of construction I prefer the locking devices shown at Figs. 26 and 29, but where a quicker action is desired that form or construction exhibited at Fig. 9 is preferable. As seen at Fig. 26, the rack-bar 7 engages with a pinion 153, which is on the inner end of a shaft 154, arranged to rotate in a fixed housing 155, and at near the rear end of said shaft is mounted loosely the escapement-wheel 156, with which the dogs 48 and 50 coöperate. At the end of said shaft 154 is affixed, by means of a hub and set-screws, a box or collar 157, containing two diametrically opposite pawls and a ratchet-wheel 159, attached to or formed integral with the escapement-wheel 156. The pawls are maintained in constant engagement with said ratchet-wheel by means of springs 160. By reason of this pawl-and-ratchet construction the escapement-wheel is caused to turn with the shaft 152, upon which it is mounted, during the down or letter-spacing movements of the carriage, but during the return movement of the carriage the parts slip over the teeth of the ratchet-wheel and do not positively drive the escapement-wheel. It has, however, been found in practice that the friction between the pawls and the ratchet-wheel is sufficient to cause the escapement-wheel to rotate during the return movement of the carriage, which is objectionable, as it causes a noise and a needless wear upon the teeth of the escapement-wheel and upon the loose or pivoted dog 50, besides which there is a liability of irregular stoppage of the carriage at different lines on return to the margin-stop, so that the left-hand margin of the paper would be uneven or irregular.

It is essential that the rack and pinion shall not have a recoil movement equal to or exceeding a letter-space distance after the carriage has come to a stop and the hand has been removed therefrom. On the removal of the hand or the return power the carriage-driving spring acts always to move the rack a slight distance toward the left, there being enough lost motion or backlash in the parts to permit this movement; but some means must be provided in the construction shown and described to limit this backlash or lost motion to a distance less than a full letter-space. Otherwise the carriage instead of stopping uniformly—say, for example, at "5"—on the scale would stop sometimes at "5" and sometimes at "6," because there is always a lost motion between the escapement-wheel and the stepping-dog, and there may frequently be a lost motion between the pawls 158 and their ratchet-wheel after the stoppage of the rack, and the sum of the lost motion of these parts, if permitted to occur, would be sufficient to enable the rack and pinion and shaft to move a distance exceeding a letter-space. To cure these objections—namely, irregular margins and backward rotation of the escapement-wheel during the return of the carriage—I have provided the following means.

On the dog-holder or rocker 49 I attach by screws 161 the arm 162, formed or provided at its upper free end with a rearwardly-projecting finger 163, whose point or tip is adapted to vibrate in and out between the teeth of the escapement-wheel simultaneously with the stepping-dog 50. Normally, or when the machine is in disuse, the dog 50 and the finger 163 stand in engagement with the escapement-wheel shown in Figs. 26 and 27. When any character-key or space-key is depressed, the said dog and said finger both vibrate forwardly out of engagement with the escapement-wheel and the rigid dog 48 comes into engagement with the latter, at which time the stepping-dog 50 vibrates toward the left, considered from the front of the machine, to engage the next tooth of the escapement-wheel, when the finger-key is released and the dog is permitted to vibrate rearwardly into the plane of rotation of the escapement-wheel, and during which vibration the finger 163 also vibrates rearwardly and also enters the same notch or space of the escapement-wheel which the stepping-dog enters, but at a point above the same nearer to the center of the wheel. Hence during the writing and spacing the said finger or device is always carried out of the path of the escapement-wheel to permit its rotation; but when the carriage is pulled back the said finger stands in the path of the escapement-wheel and holds it positively against rotation, while the pawls 158 slip idly over the teeth of the ratchet-wheel 159. By thus holding the escapement-wheel the stepping-dog remains at rest during the return of the carriage and the carriage may be stopped uniformly for all of the lines and irregularity of margins thus avoided. The feed-rack 7 being pivoted and spring-pressed, it is adapted to be lifted by the release-key lever 52, so as to permit the carriage to be run swiftly in either direction, and when the carriage is returned and the release-key pressed upon of course no part of the escapement mechanism turns, since the rack is then out of engagement with the pinion 153 on the escapement-wheel shaft.

Certain improvements herein shown are the invention of Louis P. Diss and will be set forth and claimed in a separate application to be filed by Diss contemporaneously with this.

The modifications herein shown and not specifically claimed are made the subject-matter of a divisional application filed January 24, 1898, Serial No. 667,703.

What I claim as new, and desire to secure by Letters Patent, is—

1. In a type-writing machine, the combination with a carriage, an escapement mechanism therefor operated by key-levers and including a reciprocating device, a sliding bar or rod having a contact device to be engaged by a contact device on the carriage, and an escapement-locking device arranged between said reciprocating device and said sliding bar or rod and adapted to be operated by said sliding bar or rod; the construction and arrangement being such that when engagement between said contact devices is effected said rod or bar is slid endwise and the escapement mechanism is locked by the movement of said locking device into the path of the said reciprocating device forming a part of the escapement mechanism.

2. In a type-writing machine, the combination of a carriage, an escapement mechanism therefor operated by key-levers and including a reciprocating device, a rocking bar or rod adapted also to slide endwise and having an adjustable contact device adapted to a contact device on the carriage, and an escapement-locking device adapted to be put into action when the said bar or rod is slid, and to be put out of action when the said bar or rod is rocked; the construction and arrangement being such that when the bar or rod is slid the said escapement-locking device is moved over into the path of the said reciprocating device so as to directly block its movement, and such that when the rod is rocked the said escapement-locking device is permitted to recede out of the path of said reciprocating device.

3. In a type-writing machine, the combination of a carriage, an escapement mechanism therefor operated by key-levers and including a reciprocating device, a rocking bar or rod adapted also to slide endwise and having an adjustable contact device adapted to a contact device on the carriage, an escapement-locking device adapted to be operated by the sliding of said bar or rod and to be moved into the path of said reciprocating device to directly block its movement, and a key or device for rocking said rod to effect the unlocking of the escapement mechanism and permit of further movement of the carriage.

4. In a type-writing machine, the combination of means for locking the printing mechanism, a sliding and rocking rod carrying a bell-hammer, an adjustable slide on said rod having an inclined track or way and a contact device, and a paper-carriage having a contact device adapted to first travel in engagement with said inclined track or way and rock said rod and raise said bell-hammer, and then as the carriage advances to pass out of engagement with said inclined track or way and release said rocking rod to enable it to rock back to its first position and cause the bell-hammer to strike the bell, and then as the carriage further advances to engage with the contact device on said rod and cause the said rod to move endwise and effect the locking of the printing mechanism.

5. In a type-writing machine, the combination of means for locking the printing mechanism, a rod adapted to both rock and slide and carrying an adjustable slide having a bell-hammer arm, an inclined track or way and a contact device, a carriage provided with a contact device adapted to be engaged with said track or way to first rock said rod and cause the alarm to be given, and then to slide said rod to cause the printing mechanism to be locked, and a key mechanism for again rocking said rod and separating said contact devices, whereby the printing mechanism is caused to be unlocked and the carriage is simultaneously freed for further advancement.

6. In a type-writing machine, the combination of a dog-holder, an arm adapted to prevent movement of said dog-holder and thereby lock the printing mechanism, a rod adapted to slide endwise and actuate said locking-arm, a contact device on said rod adapted to be engaged by a contact device on the carriage to effect such endwise locking movement, and a key or finger mechanism connected to said rod to rock or oscillate the same and thereby effect a separation of said contact devices, an unlocking of said printing mechanism, and at the same time free the carriage for further advancement.

7. In a type-writing machine, the combination of a rocking dog-holder, a pivoted arm adapted to prevent the rocking of said dog-holder, a rocking and sliding rod adapted to actuate said locking-arm in one direction when said rod is slid toward the left by the engagement with a contact device thereon by a contact device on the carriage, means for separating said contact devices by a rocking action of said rod, and a spring for sliding said rod back to its normal position and for restoring the locking-arm to its normal position.

8. In a type-writing machine, the combination of a rocking dog-holder having a flange or projection, a locking-arm, a rocker-arm connected thereto and provided with a projection, a sliding and rocking rod having a projection and also an adjustable contact device, a paper-carriage having a contact device, means for rocking said rod, and a spring for returning said rod.

9. In a type-writing machine, the combination of a rocking dog-holder having a flange or projection, a locking-arm adapted to be moved into the path of vibration of said dog-holder, and a sliding and rocking rod adapted to be carried endwise by means of the paper-carriage and cause the said locking-arm to be moved to a position to prevent vibration of said dog-holder, and means for rocking said rod to permit of further movement of the carriage.

10. In a type-writing machine, the combination of a rocking dog-holder having a flange or projection, a pivoted locking device consisting of an arresting-arm, a cross-bar and rocker-arm provided with a projection, a spring acting on said locking contrivance, and a sliding rod having a projection to move said locking contrivance against the action of said spring, and having also a contact device to be engaged by a contact device on the paper-carriage.

11. In a type-writing machine, the combination with the printing mechanism, of a locking device, a pivoted and sliding rod adapted to actuate said device, and a rocking mechanism connected to said rod and consisting essentially of the horizontal, sliding spring-pressed push-rod provided with a finger-piece.

12. In a type-writing machine, the combination with the printing mechanism, of a locking device, a pivoted and sliding rod having an adjustable contact device adapted to a contact device on the carriage and having a depending arm, and a spring-pressed horizontal, sliding push-rod connected at its inner end to said depending arm.

13. In a type-writing machine, the combination of a rocking rod, an adjustable slide thereon having a trip device, a contact device therefor on the carriage for rocking said rod, a bell-hammer arm attached to said rocking rod, and a bell on the framework.

14. In a type-writing machine, the combination with the printing mechanism, of a line-locking device, a pivoted and sliding rod adapted to actuate the same, a bell, a bell-hammer, a trip, and a contact on said rod, and a contact therefor on the carriage, the carriage-contact consisting of a pivoted pendent projection adapted to yield in both directions from its central or working position.

15. In a type-writing machine and in a line-locking mechanism, a pivoted contact or actuating device on the carriage mounted to yield toward the right during a swift unrestrained movement of the carriage and when the said contact device strikes against a stop or projection.

16. In a type-writing machine and in a mechanism for locking the printing mechanism, a contact device connected with the locking mechanism, and a contact device connected with the carriage, the last-mentioned contact device being mounted to yield both to the right and to the left, so that when the paper-carriage release-key is actuated and the carriage is permitted to run swiftly toward the left the said carriage-contact device under the superior force of the carriage-driving spring is caused to yield toward the right when it strikes the said locking-contact device and is thereby adapted to pass by the latter, and so that when the carriage is returned toward the right by the hand of the operator the said carriage-contact device when it meets the said line-locking device is caused to yield toward the left and to pass freely over the same.

17. In a type-writing machine and in a line-locking mechanism, a pair of contacts, one on the carriage and the other connected with the line-locking mechanism and operating normally to lock the line on the forward movement of the carriage, and one of said contacts being mounted so as to yield and permit the carriage-contact device to pass by when the carriage is disengaged from the escapement mechanism and is permitted to run swiftly toward the left.

18. In a type-writing machine and in a line-locking mechanism, the combination of a sliding rod having an adjustable contact device, a pivoted pendent contact device on the carriage having a spring and a weight and operating in substantially the manner set forth.

19. In a type-writing machine, and in a bell mechanism and line-locking mechanism, a sliding and rocking rod having an adjustable slide provided with a ledge and a contact device, a contact device on the carriage having a shaft or pivot, a spring, and a weight and operating substantially as described.

20. In a type-writing machine, the combination of a bell on the framework, a rocking rod, a bell-hammer attached to said rod, an adjustable slide on said rod having an inclined ledge, and a pivoted contact device on the carriage.

21. In a type-writing machine, the contact contrivance on the carriage consisting of the pendent projection 27, the pendent arm or plate 28, the shaft or pivot-pin 29, the weight 31, and the spring 36.

22. In a type-writing machine, the combination of a slide or collar 56 having a horn 59 and mounted on a rocking bar, and a carriage having a contact device adapted to strike against said horn on the return movement of the carriage and to also pass over said horn when the rocking bar is tilted, so as to print within the margin, and to automatically pass over said horn during the next forward movement of the carriage.

23. In a type-writing machine, the combination of a slide or collar 56 having a horn 59 and mounted on a rocking bar, a carriage having a contact-arm 60, and a carriage-arm 33 having a groove 62.

24. In a type-writing machine, the combination of the adjustable margin-stop 56 having a horn 59, the final margin-stop 63 having an arm 65, and the carriage having a contact device.

25. In a type-writing machine having a carriage and a bell mechanism, a rocking rod, having at one end an adjustable bell-trip, and at the other end an adjustable margin-stop, the rocking of the rod at one time operating the bell-hammer and at another time enabling the carriage to pass by the margin-stop for printing within the margin.

26. In a type-writing machine, the combination of a carriage, a bell on the framework, a rocking rod having a fixed bell-hammer arm, and an adjustable bell trip or actuator on said rod.

27. In a type-writing machine, the combination of a carriage, a bell mechanism, and a rocking rod arranged parallel with the path of travel of the carriage and carrying one member of the bell mechanism and also an adjustable bell trip or actuator; the carriage operating to automatically rock the rod and thereby cause the bell to be rung at varying predetermined points.

28. In a type-writing machine, the combination of a carriage, a bar adapted to slide endwise and carrying a finger or projection disposed in the direction of the length of said bar, and an escapement-rocker vibrating in a direction at right angles to said bar and adapted to be arrested by said finger or projection when said bar is slid endwise by the action of the carriage.

29. In a type-writing machine, the combination of a carriage, an endwise-movable bar carrying a longitudinally-arranged finger or projection, and an escapement-rocker carrying an arm or projection adapted to contact with said finger or projection when said bar is slid endwise.

30. In a type-writing machine and in a ribbon-reversing mechanism, the combination of a power-shaft carrying gears and worms, spool-shafts carrying gears and spools, and pins adapted when the ribbon is unwound to be projected into engagement with said worms and cause a shifting of the power-shaft gears whereby the ribbon is caused to be run in the reverse direction.

31. In a type-writing machine and in a ribbon-reversing mechanism, a ribbon, a pair of ribbon-spools, a pair of ribbon-spool shafts, a power-shaft, two pairs of gears by which said spools are alternately driven, a worm arranged opposite each spool-shaft, and a pin or device carried by each said spool-shaft adapted to engage with its associated worm to cause the gears on the power-shaft to shift so as to reverse the longitudinal travel of the ribbon.

32. In a type-writing machine, the combination of a ribbon, a pair of ribbon-spools, a pair of ribbon-spool shafts, a power-shaft, two pairs of gears adapted to alternately drive said spools, a worm opposite each spool-shaft, a pin or device connected to slide endwise of said shaft and engage with said worm, means connected with said pin and controlled by the folds of the ribbon for moving said pin when the ribbon has been discharged from its spool.

33. In a type-writing machine, the combination of a ribbon, a ribbon-spool, a ribbon-spool shaft, a power-shaft, gears for turning said ribbon-spool shaft, a worm on the power-shaft, a pin on the ribbon-spool shaft, and a lever or arm connected to said pin and controlled by the folds or coils of the ribbon in such a manner that the said pin is normally held out of engagement with said worm, and in such a manner that when the said arm or lever escapes from the control of said ribbon it operates to move the said pin into engagement with said worm and cause a reversal of the gearing and a reversal of the direction of travel of the ribbon.

34. In a type-writing machine, the combination of a ribbon, a ribbon-spool having a slot, a ribbon-spool shaft having a perforation, a pin adapted to slide therein, a lever pivoted on said shaft and connected to said pin, and also adapted to enter said slot in the spool and be held therein by the ribbon, a gear on said spool-shaft, a sliding gear adapted to engage with and be disengaged from the gear on the spool-shaft and a worm connected to said sliding gear and adapted to be engaged by said pin when the ribbon has been unwound from the spool, whereby the said gears are brought into engagement and the ribbon is reversed.

35. In a type-writing machine, the combination of a switch mechanism, a ribbon, a ribbon-spool having a slot, a ribbon-spool shaft having a longitudinal sliding pin, a lever connected to said sliding pin and adapted to the slot in the spool, the said pin being actuated by the release of the lever, when the spool is discharged of its ribbon, and moved to operate on the switch mechanism and cause a reversal of the longitudinal travel of the ribbon.

36. In a type-writing machine, the combination of a switch mechanism, a ribbon, a ribbon-spool, a lever adapted to turn with the spool and both fall away from and toward the axis thereof and to be held toward the axis by the folds of the ribbon, and a sliding pin or device connected to said lever and adapted to be moved into and out of engagement with the switch mechanism by the action of said lever.

37. In a type-writing machine, the combination of a shifting mechanism, a ribbon, a ribbon-spool having a slot in its body and an opening in its head, a spool-shaft having a gear and an axial perforation, a pin adapted to slide in the latter, a collar attached to said shaft, and a lever pivoted to said collar and connected with said pin.

38. In a type-writing machine, the combination of a power-shaft having a pair of spool-driving gears and a pair of worms, and means controlled by the ribbon for alternately engaging said worms and reversing the gearing and the direction of travel of the ribbon.

39. In a type-writing machine and in a ribbon-shifting mechanism, the combination with the shifting driving-gears, a lever connected thereto and having a bearing portion, a spring, and a device adapted to work in conjunction with said bearing portion and comprising essentially two notches or seats and two oppositely-inclined surfaces intermediate said notches or seats.

40. In a type-writing machine and in a ribbon-shifting mechanism, means for completing the switching action consisting of oppositely-acting inclined faces, a pivoted arm or lever having a bearing portion, and a spring to cause pressure between said faces and said bearing portion.

41. In a type-writing machine, the combination with the mechanism for moving the ribbon longitudinally in either direction, and an automatic shifting mechanism, of a contrivance consisting of oppositely-acting inclined faces, an antifriction-roller to act on said faces, and a spring to cause the roller to press against the faces to automatically complete the shifting action.

42. In a type-writing machine, the combination with mechanism adapted to move the ribbon longitudinally in either direction, a shifting mechanism between the ribbon-spools and the driving power, means adapted to automatically coact with the shifting device for the purpose of performing the first part of the shifting action, and a contrivance consisting of oppositely-acting inclined faces, a lever having a bearing portion, and a spring for the purpose of completing the shifting action and reversing the ribbon travel, one of the inclined faces being acted upon during the first part of the movement of the shifting device to store energy in the spring, and the other inclined face operating to release said energy and cause the shifting device to complete its movement.

43. In a type-writing machine, the combination of a power-shaft having a pair of spool-driving gears and a pair of worms adapted to slide endwise, a pair of ribbon-spools, gears, connected to said spools to be driven by the gears on the power-shaft, a pair of pins adapted to said worms and controlled by the inking-ribbon, oppositely-acting inclined faces, a lever connected to the power-shaft and having an antifriction-roller to act in conjunction with said faces, and a spring to cause pressure between the faces and the roller.

44. In a type-writing machine and in a shifting mechanism, the combination with the shifting power-shaft, of a lever engaging therewith at one end and pivoted at its opposite end and having a roller, and a spring-pressed device having oppositely-acting inclined faces to operate in conjunction with said roller.

45. In a type-writing machine and in a ribbon-shifting mechanism, the combination with means for moving the ribbon lengthwise in either direction, worms and pins for shifting the means for moving the ribbon longitudinally, and spring-acted wedging means for completing the shifting movement.

46. In a type-writing machine, the combination of an inking-ribbon, ribbon-spools, ribbon-spool shafts provided with gears and with worms, pins in said spool-shafts adapted to said worms, a spring-drum carrying a gear adapted to engage with a companion gear loose on the power-shaft, a crank-arm attached to the last-mentioned gear, and a second crank-arm attached to the power-shaft and connected to the first-mentioned crank-arm.

47. In a type-writing machine, the combination of a spring-drum having a gear, a power-shaft adapted to slide endwise, a gear sleeved on said power-shaft and carrying a crank-arm, a second crank-arm attached to said power-shaft, and an elongated pin connecting said crank-arms.

48. In a type-writing machine, the combination of a ribbon, a pair of ribbon-spools connected together, a ribbon-carrier embracing one of said spools and consisting of the bars 135 and 138, the fork 140, the hinge-pin 141, and a crank-arm, a spring-catch, a ribbon guide-plate attached at one end to said hinge-pin and at the other end embracing the opposite ribbon-spool, a cam acting to move the ribbon-carrier in one direction and a spring acting to move said carrier in the opposite direction.

49. In a type-writing machine, the combination of an inking-ribbon, a pair of ribbon-spools, a pair of ribbon-spool shafts, a ribbon-spool carrier for one of said ribbon-spools, a connecting-plate between said spools, a cam for moving said ribbon-spool carrier, a worm and worm-wheel for turning said cam, and a pawl-and-ratchet mechanism for turning said worm.

50. In a type-writing machine and in a mechanism for moving the ribbon transversely to its longitudinal movement, the combination of a cam which moves the ribbon crosswise, a worm-wheel, a worm, and a pawl-and-ratchet mechanism for turning said worm periodically.

51. In a type-writing machine and in a mechanism for moving the inking-ribbon transversely, a cam, a worm-wheel, a worm, a ratchet-wheel connected to the worm-shaft, a lever carrying a pawl adapted to said ratchet-wheel, and a device connected with the carriage-driving drum for periodically vibrating said pawl-carrying lever.

52. In a type-writing machine, the combination of an inking-ribbon, a pair of ribbon-spools connected together, a pair of ribbon-spool shafts, a ribbon-spool carrier, a cam adapted to act on said carrier, a worm-wheel and worm for turning said cam, and a pawl-and-ratchet mechanism connected to the driving power for turning said worm.

53. In a type-writing machine, and in a mechanism for moving the ribbon transversely in both directions, the combination of a pair of connected ribbon-spools, a ribbon-spool carrier, a spring for moving said carrier in one direction, and a mechanism for moving the ribbon in the other direction, consisting of a cam, a worm-wheel, a worm-shaft, and a pawl-and-ratchet mechanism.

54. In a type-writing machine and in an escapement mechanism comprising an escapement-wheel, means in engagement with said wheel to prevent its backward rotation, said means being connected to the spacing mechanism so as to move into and out of engagement with said wheel during letter-spacing or printing actions, and so arranged as to be normally in engagement with said wheel during the disuse of the keys and during the return movement of the carriage.

55. In a type-writing machine and in an escapement mechanism comprising an escapement-wheel, a dog-rocker carrying a device which in the normal, unused condition of said rocker engages said escapement-wheel and prevents its backward rotation, but which is adapted to release said wheel when said rocker is vibrated for letter-spacing movements of the carriage.

56. In a type-writing machine, the combination of a carriage having a feed-rack, a shaft carrying a pinion, an escapement-wheel mounted on said shaft, a pawl-and-ratchet mechanism connected to said shaft to turn said escapement-wheel positively with the pinion during the down movements of the carriage, escapement-dogs adapted to coöperate with the said escapement-wheel, and a locking or holding device normally in engagement with said escapement-wheel to check it against backward rotation and arranged to move out of engagement therewith when the escapement-dogs are actuated.

57. In a type-writing machine, the combination of a carriage, a shaft having a fixed pinion and a loose escapement-wheel provided with a ratchet-wheel, a pawl mechanism attached to said shaft and in engagement with said ratchet-wheel, escapement-dogs, and a device movable with said dogs to arrest the backward rotation of said escapement-wheel.

58. In a type-writing machine, the combination in an escapement mechanism, of an escapement-wheel driven in one direction by a pawl-and-ratchet mechanism, and a dog-rocker carrying a holding-dog, a stepping-dog, and a device to hold said escapement-wheel against backward rotation during the return movement of the carriage.

59. A ribbon-spool having a longitudinal slot or depression in its body and a slot or cutaway in its head, for the accommodation and operation of a lever or arm substantially as shown and described.

Signed at New York, in the county of New York and State of New York, this 5th day of February, A. D. 1897.

GEORGE B. WEBB.

Witnesses:
  CORNELIUS P. MCLAUGHLIN,
  K. V. DONOVAN.